C. B. OULTON.
ROSE ENGINE TURNING MACHINE.
APPLICATION FILED APR. 23, 1920. RENEWED AUG. 1, 1922.

1,428,801.

Patented Sept. 12, 1922.
2 SHEETS—SHEET 1.

Inventor.
Charles B. Oulton
by Heard Smith & Tennant.
Attorneys.

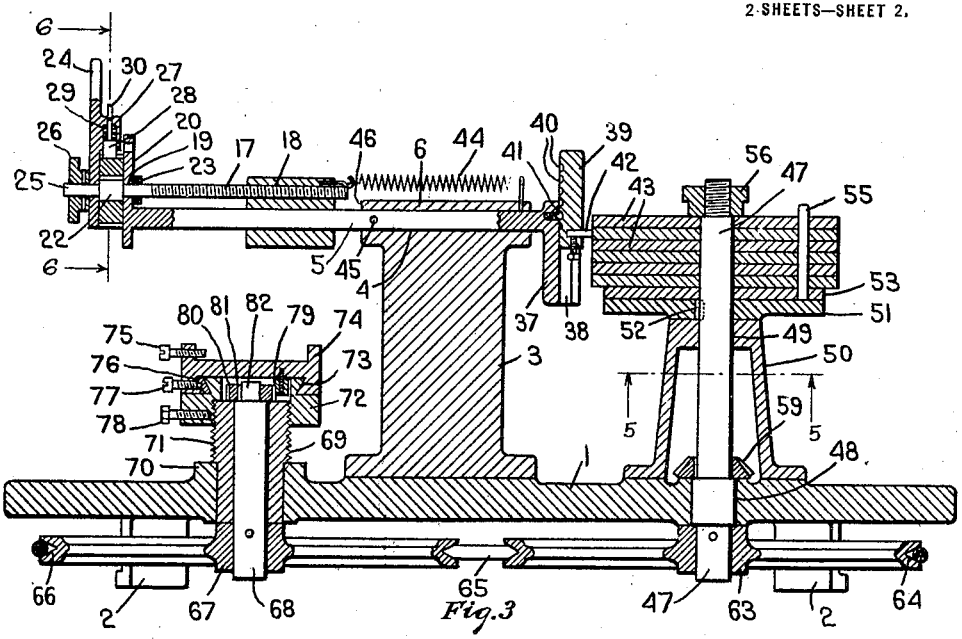
C. B. OULTON.
ROSE ENGINE TURNING MACHINE.
APPLICATION FILED APR. 23, 1920. RENEWED AUG. 1, 1922.
1,428,801.
Patented Sept. 12, 1922.
2 SHEETS—SHEET 2.
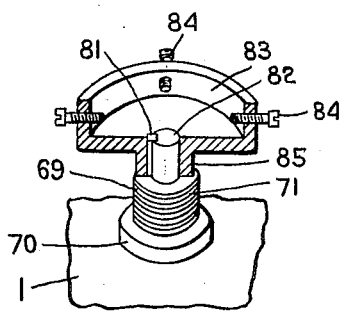
Fig. 4
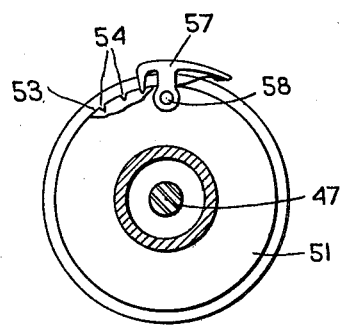
Fig. 5
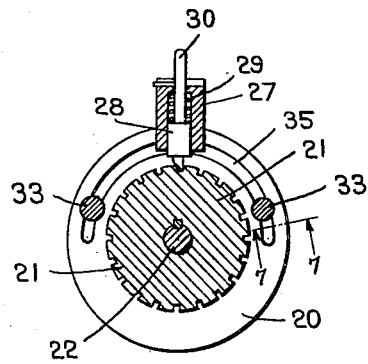
Fig. 6
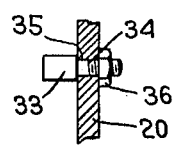
Fig. 7
Inventor.
Charles B. Oulton
by Heard Smith & Tennant.
Attorneys.

Patented Sept. 12, 1922.

1,428,801

UNITED STATES PATENT OFFICE.

CHARLES B. OULTON, OF ATTLEBORO, MASSACHUSETTS.

ROSE-ENGINE-TURNING MACHINE.

Application filed April 23, 1920, Serial No. 375,975. Renewed August 1, 1922. Serial No. 579,061.

*To all whom it may concern:*

Be it known that I, CHARLES B. OULTON, a citizen of the United States, and resident of Attleboro, county of Bristol, State of Massachusetts, have invented an Improvement in Rose-Engine-Turning Machines, of which the following description, in connection with the accompanying drawing, is a specification, like characters on the drawing representing like parts.

This invention relates to improvements in rose engine turning machines or rose engine turning lathes which are adapted to turn or cut a predetermined pattern upon the work. Rose engine turning machines which have been heretofore constructed have been of a complicated nature and of expensive construction. The principal object of the present invention is to provide a simplified form of rose engine turning machine which will be of relatively inexpensive construction and which will be capable of producing a wide number of designs or patterns.

A further object of the invention is to produce a rose engine turning machine in which the work is actuated by a mandrel and the tool controlled by a rosette, or preferably one of a series of superimposed rosettes, which may be selectively caused to actuate the tool, the rosettes preferably being carried upon a shaft which is parallel to the axis of the mandrel.

A further object of the invention is to provide a machine of this character with indexing means for positioning the rosettes whereby different patterns may be produced by the association of lines produced from the same rosette when indexed at different positions, or by the association of patterns produced by different rosettes when indexed in a predetermined manner.

A further object of the invention is to provide a machine of the character described with indexing means for controlling the position of the tool relatively to the work adapted to be utilized either alone or in combination with the indexing mechanism which positions the rosettes.

A further object of the invention is to provide an improved means for synchronizing the rotation of the work actuating mandrel and the rosette actuating shaft.

A further object of the invention is to provide a novel means for supporting the work carrying chuck, the construction preferably being such that either a rotary chuck holder may be employed or a reciprocating chuck holder, in either event the chuck holder being actuated from the mandrel.

Other objects and features of the invention will more fully appear from the following description and the accompanying drawings and will be particularly pointed out in the annexed claims.

In the drawings:

Fig. 3 is a central, vertical, longitudinal section of the same on line 3—3, Fig. 2.

Fig. 4 is a detail perspective view, partly in section, showing the means by which the chuck holder is supported and actuated from the mandrel.

Fig. 5 is a detail transverse sectional view on line 5—5, Fig. 3, showing the indexing mechanism for the rosette holder.

Fig. 6 is a vertical sectional view on line 6—6, Fig. 3, of the indexing means for rotating the screw which controls the tool holder, and, Fig. 7 is a sectional view on line 7—7, Fig. 6, showing the manner of securing one of the adjustable stops which limits the movement of the indexing means for the screw which adjusts the tool holder.

Figure 1:
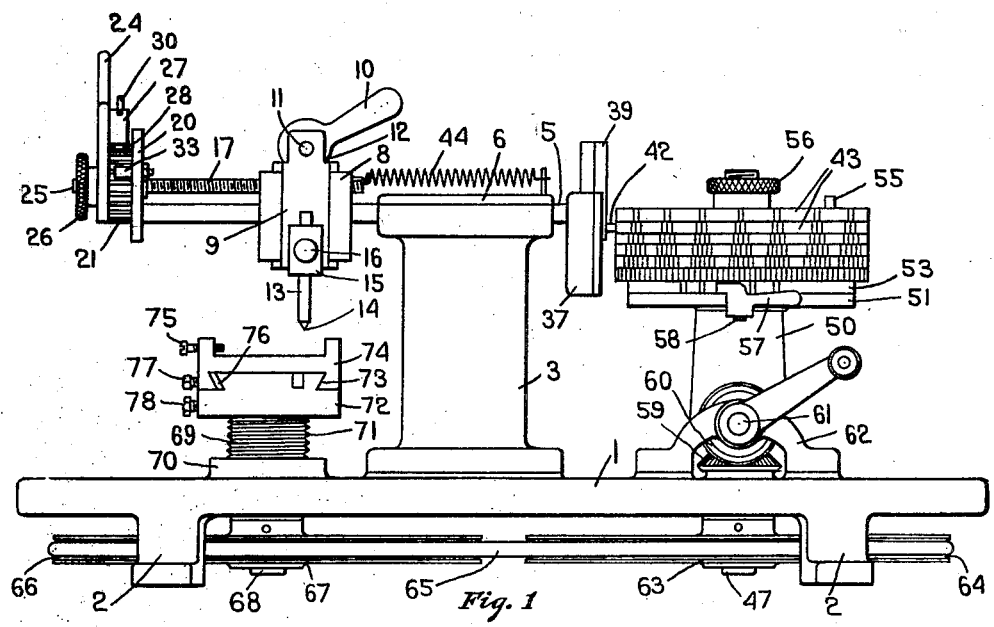
Fig. 1 is a side elevation of a rose engine turning machine comprising a preferred embodiment of my invention.
Figure 2:
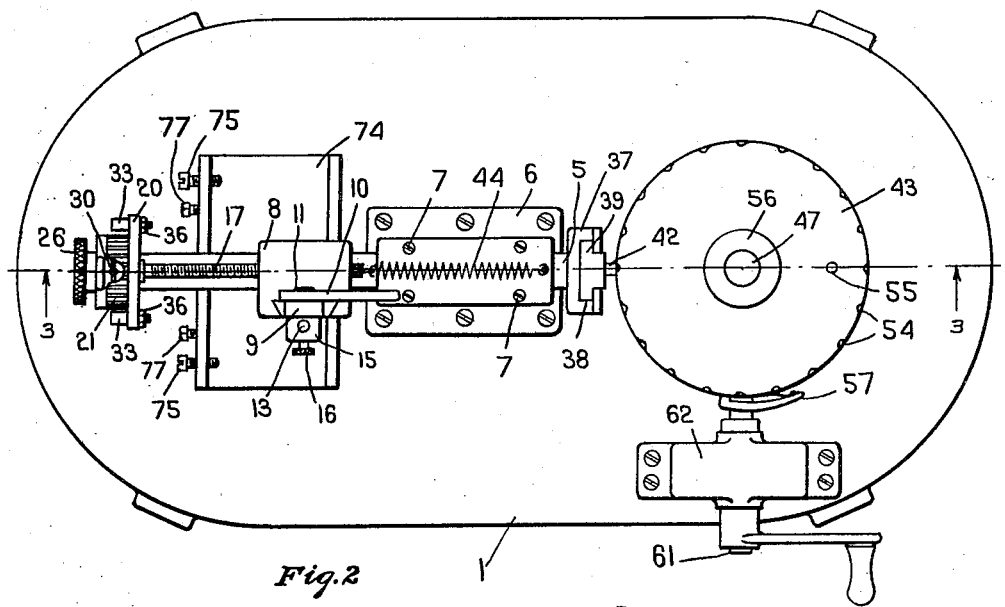
Fig. 2 is a plan view of the same.

The rose engine turning machine or lathe illustrated in the accompanying drawings may be generally described as comprising a base which has journalled in it a mandrel for actuating a work holding chuck, means being provided to impart to the chuck and work either a rotary or a reciprocating motion, and is also provided with means for supporting a reciprocable tool slide having a tool carriage adjustably mounted upon it. The tool slide is adapted to be reciprocated to produce predetermined patterns by means of a rosette, or preferably a series of superimposed rosettes, which are carried upon a rosette shaft which is rotated in synchronism with the rotation of the mandrel.

The preferred embodiment of the invention illustrated herein comprises a bed 1 which has downwardly extending legs 2, or a flange, adapted to rest upon a table or other base to support the bed 1 a sufficient distance above the table to provide a space for the means for rotating the work actuating mandrel and the rosette shaft.

A standard 3, preferably secured to and rising from the central portion of the bed 1, is provided at its upper end with a horizontal guide-way 4 in which is mounted a tool slide 5, said tool slide being retained in place by a cap 6 which is secured to the top of the standard 3 by suitable screws 7.

A tool carriage 8, which is slidably mounted upon said tool slide, supports a tool holder 9 which is vertically mounted in ways in the tool carriage and is adapted to be raised and lowered by means of a handle 10 connected by a pin 11 to the tool slide and provided with a cam shaped face 12 which engages the carriage so that the tool slide may be raised and lowered manually by suitable movement of the handle.

A tool 13, which desirably is provided with a diamond point 14, is clamped in a suitable boss 15 extending laterally from the slide 9 by a set screw 16. Means are provided for moving the tool carriage along the tool slide, the preferred mechanism preferably being a screw 17 which engages suitable threads 18 in the tool carriage and is mounted in a suitable bearing 19 in a circular head or boss 20 located preferably at one end of the tool slide. Indexing means are provided for rotating the screw 17 in either direction, said indexing means preferably being in the form of a ratchet 21 secured to an enlarged portion or hub 22 upon the shaft of the screw, the end of said hub abutting against one face of the boss 20, and a suitable collar or pin 23 secured to the screw upon the opposite side of the boss 20 serving to prevent longitudinal movement of the screw through said boss.

Suitable pawl mechanism may be provided for rotating the ratchet 21. As illustrated herein the pawl mechanism comprises an arm 24 which is rotatably mounted upon the end portion 25 of the screw shaft and is retained thereon by a nut 26 which may be pinned to the screw shaft. The arm 24 is provided with a laterally extending boss 27, preferably circular in cross section, in which a pawl 28 is reciprocably mounted and is held in contact with the teeth of the ratchet by a helical spring 29. The pawl 28 is provided with an upwardly extending stem 30 which passes through the upper wall of the boss 27 which may be rotated by suitable means to reverse the position of the pawl.

The pawl, which is illustrated in detail in Fig. 6, is provided with one straight face and one bevel face so that by rotating the pawl in its socket the straight face may be positioned to engage the teeth in such a manner as to rotate the screw alternatively in a right handed or left handed direction.

In producing patterns of various designs it is frequently desirable to have means for limiting the extent of indexing movement which can be given to the ratchet 21. This result is secured in the present invention by providing one, or preferably two, stops 33, each of which is provided with a stem 34 which extends through a slot 35 in the boss 20 and is clamped in adjusted position by a nut 36 upon the screw threaded end of the stem 34 abutting against the wall of the boss 20, (Fig. 7).

Reciprocating movement may be imparted to the tool slide through a follower which is adapted to engage a suitable rosette, or preferably of such a character as to be so positioned as to engage selectively any one of a series of superimposed rosettes. In the preferred embodiment of the invention disclosed herein the end of the tool slide, opposite to that which supports the indexing mechanism, is provided with a downward extension 37 having in it a way 38 in which a slide 39 is adjustably mounted, the slide desirably having a series of notches 40 which are angaged by a spring actuated locking ball or dog 41 slidably mounted in a suitable recess in the slide. By using a locking ball adapted to engage substantially hemispherical sockets 40 means are provided whereby the slide 39 may be easily raised and lowered and locked in a desired adjusted position.

The slide 39 carries a follower 42 which may be in the form of a pin secured in the slide by a suitable set screw, the follower 42 being thus adapted to engage any one of a series of superimposed rosettes carrying suitable patterns for regulating the reciprocation of the tool slide.

The follower 42 is normally retained in engagement with a rosette 43 by resilient means, preferably a spring 44 which is secured at one end to the tool carriage 8 and at its opposite end anchored in any suitable manner to the standard 3. Thus it will be obvious that the tool carriage and the tool carried by it will be reciprocated in accordance with the pattern of the rosette and that by the use of an indexing mechanism the tool carriage may be so positioned upon the tool slide as to cause the tool to engage different portions of the work upon which the design is to be cut.

Where it is desired to produce circular cuts upon the work, when the latter is carried by a rotating chuck, or straight lines upon the work, when the same is carried by a reciprocating chuck, the tool slide is held in a fixed position so that the follower 42 is out of contact with any rosette. This may be accomplished by providing a hole 45 in the slide into which a suitable pin may be introduced and caused to abut against the side 46 of the standard 3, the pin being held in contact therewith by the action of the spring 44.

If desired a further refinement of such holding mechanism may be provided by securing to the standard or to the slide a screw, or other adjustable device, adapted to engage a stop on the relatively reciprocating member.

The rosette, or preferably a series of superimposed rosettes, 43 are mounted upon a rosette shaft 47 in such a manner as to be rotated thereby. As disclosed herein the rosette shaft 47 is journalled in a suitable bearing 48 in the base and in a supplemental bearing 49 in a stand 50 which is secured to the base. A rosette supporting plate 51 rests upon the top of the stand 50 and is secured to the rosette shaft 49 by a key 52.

An indexing disk 53 having a plurality of notches 54 is rotatably mounted upon the rosette shaft 41 and rests upon the supporting disk 51. The indexing disk 53 is provided with one or more posts 55 extending upwardly through suitable apertures in the rosettes 43. A nut 56 on the screw threaded upper end of the rosette shaft serves to clamp the rosettes in position. A pawl 57, which is mounted upon a stud 58 on the rosette supporting plate 51, engages a notch 54 and serves to retain the indexing disk 53 in any adjusted position. By the provision of suitably spaced notches various patterns may be produced upon the work by indexing the rosettes to different positions, since in such case the action of the pattern of the rosette upon the follower will be varied in its timing relation to the reciprocation or rotation of the work.

Any suitable means may be provided for rotating the rosette shaft. As illustrated herein a beveled gear 59 is keyed to the rosette shaft 48 and is rotated through a companion gear 60 upon a shaft 61 which is mounted in a suitable bracket 62 secured to the bed 1. A pulley 63, secured to the lower end of the rosette shaft and preferably provided with a peripheral V-shaped driving groove 64, actuates a belt 65 which engages a V-shaped groove 66 of the pulley 67 which is secured to the work actuating mandrel 68, thereby rotating the work actuating mandrel in synchronism with the rotation of the rosette shaft. Preferably the pulleys 63 and 67 are of equal diameter, but by the substitution of pulleys of different diameters various different patterns may be produced.

The mandrel 68 desirably is journalled in a sleeve 69 which is fixedly secured in a boss 70 in the bed 1, the upper portion of the sleeve 69 being preferably somewhat enlarged and provided with screw threads 71 adapted to engage complementary threads in a base 72 having a guide 73 for a slide 74 provided with clamping screws 75 or other means for engaging a work holding chuck. A suitable shim 76, having backing screws 77, may be introduced between the slide in its guide-way to insure a perfect rectilinear motion of the slide.

The base 72 may be fixedly secured against rotation upon the sleeve 69 by a set screw 78 passing through the slide and abutting against the sleeve 69, or by any other suitable clamping means. The slide 74 preferably is reciprocated through a rack 79 secured to the under face of the slide and engaging a pinion 80 which is secured by a key 81 to the reduced upper end portion 82 of the mandrel 68, said reduced end portion desirably providing a shoulder which is substantially flush with the upper end of the sleeve 69.

Other forms of work supporting devices may be secured to the work actuating mandrel. For example, a chuck 83, having suitable clamping screws 84 and having a hub 85 to receive the reduced end portion 82 of the mandrel, may be secured upon said mandrel by the key 81, where it is desired to rotate the work, instead of reciprocating it relatively to the tool. It will, therefore, be understood that rotating and reciprocating means for holding the work chuck may be alternatively utilized by the substitution of one for the other as above described.

In the operation of the machine the work holding chuck, (not shown) is clamped by the screws 75 upon the slide 74 in one case, or by the screws 84 in the chuck 83 in the other, and is suitably reciprocated or rotated as the case may be by the rotation of the mandrel 69. If the tool is held stationary, with its diamond point in contact with the work, a straight line will be produced upon the work when the slide is reciprocated, or a circle produced upon the work when the chuck 83 is rotated. These, of course, are the simplest patterns.

In order to produce other patterns the tool may be given any desired relative movement to that of the work which may be produced by the patterns upon the various rosettes. Inasmuch as the rotation of the mandrel 68 and of the rosette shaft are in synchronism, the pattern produced by the conjoint movement of the work and reciprocation of the tool will be repeated as often as the mandrel and rosette pass through a complete cycle of movements. By adjusting the tool carrier upon the tool slide the position of the various patterns upon the work may be varied so that a plurality of parallel lines may be cut upon the work whether the same are straight lines, circles or irregular lines produced by the conjoint movement of the work and the tool. These parallel lines may be produced at desired intervals by moving the indexing arm 24, which rotates the screw 17, to regulate the position of the tool carriage. By adjusting the stops 33 which are anchored in the boss 20 on the tool slide, regular desired intervals between the successive parallel lines may be conveniently maintained, as it is only necessary to oscillate the indexing arm 29 from one stop 33 to the other without the necessity of examining each time the precise distance through which the indexing arm is oscillated.

By reversing the position of the pawl 28 the screw 17 may be rotated in opposite directions to move the tool either to the right or to the left as may be desired and in either instance the stops 33 will serve to determine the intervals between the successive parallel lines.

It will be understood that under such circumstances corresponding portions of the lines will remain in parallelism whether the same are regular lines, or irregular lines such as are produced by a rosette having a notched or curved or uneven face. By indexing the rosettes the position of the irregular movements of the tool upon the work may be varied, consequently a wide variety of patterns may be produced upon a single rosette. By providing a series of superimposed rosettes, such as are illustrated herein, with different patterns, combinations of movements of the tool may be readily made by merely shifting the follower from one rosette to the other so that a practically infinite variety of patterns may be produced upon the work.

The rosettes disclosed herein comprise a series having a row of spaced peripheral notches in the upper rosette, a similarly placed series of 2, 3, 4 and 5 notches upon successively lower rosettes and the lowermost rosette having a continuous series of notches extending around the periphery of the rosette. By means of these simple rosettes a large number of patterns, including parallel lines having waves at various intervals, or disposed so as to form small diamonds, or to form herring-bone figures, or intricate diamond shaped figures, may be produced either upon reciprocating or rotating work and by the substitution of other forms of rosettes various irregular figures, such as ellipses, squares, and other devices may be produced to an infinite number upon this very simple machine.

It will be understood that various modifications in the mechanisms may be employed within the scope of my invention and that any suitable form of rosette, or combinations of rosettes, may be employed since the particular mechanism disclosed herein is of an illustrative and not a restrictive character in respect to the terms of the following claims.

Having thus described my invention, what I claim as new and desire to secure by Letters Patent, is:

1. A rose engine lathe comprising a horizontal base and a vertical work actuating mandrel, and a vertical rosette shaft arranged in parallelism with said mandrel, means for detachably securing a plurality of rosettes to said rosette shaft, means for rotating said mandrel and said shaft in synchronism, a tool slide, a tool holder mounted thereon, a follower on said slide, adapted to engage a rosette and means for selectively positioning said follower to engage different rosettes and means for yieldingly holding said follower in engagement with the rosette.

2. A rose engine lathe comprising a work actuating mandrel, a rosette shaft arranged in parallelism with said mandrel, means for securing a plurality of superimposed rosettes having peripheral patterns upon said rosette shaft, a tool slide, a tool holder mounted on said slide, a follower on said slide, means for selectively positioning said follower to engage the periphery of any of said rosettes and indexing means for rotarily adjusting said rosettes.

3. A rose engine lathe comprising a work actuating mandrel, a rosette shaft, means for rotating said mandrel and said shaft in synchronism, means for detachably securing a rosette to said shaft, a tool slide, a follower on said tool slide adapted to engage said rosette, resilient means for retaining said follower in contact with said rosette, a tool carriage mounted on said tool slide and means for adjusting said tool carriage along said tool slide.

4. A rose engine lathe comprising a work actuating mandrel, a rosette shaft, means for rotating said mandrel and said shaft in synchronism, means for detachably securing a rosette to said shaft, a tool slide, a follower on said tool slide adapted to engage said rosette, resilient means for retaining said follower in contact with said rosette, a tool carriage mounted on said tool slide, means for adjusting said tool carriage along said tool slide comprising a screw and indexing means for rotating said screw.

5. A rose engine lathe comprising a work actuating mandrel, a rosette shaft, means for rotating said mandrel and said shaft in synchronism, means for detachably securing a rosette to said shaft, a tool slide, a follower on said tool slide adapted to engage said rosette, resilient means for retaining said follower in contact with said rosette, a tool carriage mounted on said tool slide, means for adjusting said tool carriage along said tool slide comprising a screw and pawl and ratchet mechanism for rotating said screw.

6. A rose engine lathe comprising a work actuating mandrel, a rosette shaft, means for rotating said mandrel and said shaft in synchronism, means for detachably securing a rosette to said shaft, a tool slide, a follower on said tool slide adapted to engage said rosette, resilient means for retaining said follower in contact with said rosette, a tool carriage mounted on said tool slide, means for adjusting said tool carriage along said tool slide comprising a screw, pawl and ratchet mechanism for rotating said screw and adjustable stops on said carriage for limiting the movement of said pawl and ratchet mechanism.

7. A rose engine lathe comprising a work actuating mandrel, a rosette shaft extending in parallelism therewith, means for rotating said mandrel and said shaft in synchronism, means for detachably securing a rosette to said rosette shaft, a tool slide having a follower engaging said rosette, a tool holder on said tool slide, a work chuck holder and means for actuating said work chuck holder from said mandrel.

8. A rose engine lathe comprising a work actuating mandrel, a rosette shaft extending in parallelism therewith, means for rotating said mandrel and said shaft in synchronism, means for detachably securing a rosette to said rosette shaft, a tool slide having a follower engaging said rosette, a tool holder on said tool slide, a work chuck holder comprising a slide, and rack and pinion mechanism for actuating said work chuck holder from said mandrel.

9. A rose engine lathe comprising a work actuating mandrel, a rosette shaft, means for detachably securing a rosette to said shaft, a tool slide, a follower on said tool slide engaging said rosette, a tool carriage on said slide, a tool holder slidably mounted in said carriage and hand operated means for adjusting said tool relatively to the work.

10. A rose engine lathe comprising a base, a vertical work actuating mandrel rotatably mounted in said base, a vertical rosette shaft rotatably mounted in said base, means for securing a plurality of rosettes to said rosette shaft, a standard intermediate of said mandrel and said shaft, a tool slide reciprocably mounted in said standard, a follower on said tool slide adapted to engage said rosette, resilient means for retaining said follower in contact with said rosette, a tool holder mounted on said tool slide, means for adjusting the same thereon, including a screw, indexing means for rotating said screw, indexing means for rotarily adjusting said rosettes and means for rotating said mandrel and said shaft in synchronism.

11. In a rose engine lathe comprising a base, a vertical sleeve mounted in said base, a work actuating mandrel journalled in said sleeve, a work carrying chuck holder, means for actuating the same from said mandrel, a tool holder positioned in operative relation to said work chuck holder, means for rotating said mandrel and means for moving said tool holder.

12. In a rose engine lathe comprising a base, a vertical sleeve mounted in said base, a work actuating mandrel journalled in said sleeve, a slide holder mounted upon said sleeve, a work chuck supporting slide reciprocably mounted upon said slide holder, means for rotating said mandrel and means for imparting reciprocating movement from said mandrel to said slide.

13. In a rose engine lathe comprising a base, a vertical sleeve mounted in said base, a work actuating mandrel journalled in said sleeve, a slide holder mounted upon said sleeve, a work chuck supporting slide reciprocably mounted upon said slide holder, means for rotating said mandrel and means for imparting reciprocating movement from said mandrel to said slide including a pinion on said mandrel and a co-operating rack upon said slide.

14. In a rose engine lathe comprising a work actuating mandrel, a rosette shaft, means for detachably securing a rosette to said shaft, a tool slide having a follower engaging said rosette, and resilient means for maintaining said follower in contact with said rosette, a tool carrier mounted upon said slide in co-operative relation to said work actuating mandrel and means for rotating said mandrel and said shaft in synchronism, including pulleys upon said mandrel and said shaft and a belt engaging said pulley.

In testimony whereof, I have signed my name to this specification.

CHARLES B. OULTON.